(12) United States Patent
Baghel et al.

(10) Patent No.: US 12,549,244 B2
(45) Date of Patent: Feb. 10, 2026

(54) DEVICES AND METHODS FOR BEAM TRACKING

(71) Applicant: Apple Inc., Cupertino, CA (US)

(72) Inventors: Sudhir K Baghel, Pleasanton, CA (US); Sudeep Bhattarai, Hayward, CA (US); Amol P Bhatkar, San Jose, CA (US); Seshu Tummala, Cupertino, CA (US); Venkateswara Rao Manepalli, San Jose, CA (US); Mehran T Baghaei, San Diego, CA (US); Lohit Sarna, San Mateo, CA (US); Nishant Pattanaik, San Diego, CA (US); Jay P Shah, Newark, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 18/602,958

(22) Filed: Mar. 12, 2024

(65) Prior Publication Data
US 2024/0223261 A1    Jul. 4, 2024

Related U.S. Application Data

(63) Continuation of application No. 17/890,793, filed on Aug. 18, 2022, now Pat. No. 11,956,057.

(51) Int. Cl.
*H03B 7/10*    (2006.01)
*H04B 7/08*    (2006.01)
(Continued)

(52) U.S. Cl.
CPC ........ *H04B 7/088* (2013.01); *H04W 72/0446* (2013.01); *H04W 72/046* (2013.01)

(58) Field of Classification Search
CPC ............ H04W 16/28; H04W 72/1273; H04W 74/006; H04B 7/0695; H04B 7/0617;
(Continued)

(56) References Cited

U.S. PATENT DOCUMENTS

2005/0070266 A1 * 3/2005 Senarath ............... H04W 16/12
455/422.1
2009/0279512 A1 11/2009 Fujishima et al.
(Continued)

FOREIGN PATENT DOCUMENTS

WO    2016178838 A1    11/2016

*Primary Examiner* — Khai Tran
(74) *Attorney, Agent, or Firm* — FLETCHER YODER PC

(57) ABSTRACT

User equipment includes one or more antennas, a receiver coupled to the one or more antennas, and processing circuitry coupled to the receiver and configured to cause the user equipment to receive downlink signals at each communication cycle using a predetermined beam in a beam time slot. Based on processed downlink signals and other relevant information the user equipment may determine a desired beam for the next communication cycle. If the desired beam is the same as the predetermined beam, the user equipment may continue using the predetermined beam at the next communication cycle. If the desired beam is different from the predetermined beam, the user equipment may switch to the desired beam at the next communication cycle. In this way, the user equipment may continue tracking a desired beam to maintain reliable data communications with a communication node.

20 Claims, 8 Drawing Sheets

(51) Int. Cl.
*H04W 72/044* (2023.01)
*H04W 72/0446* (2023.01)

(58) Field of Classification Search
CPC ..... H04B 7/088; H04B 7/0417; H04L 1/0026; H04L 5/0023
USPC ........................................................ 375/347
See application file for complete search history.

(56) References Cited

U.S. PATENT DOCUMENTS

| | | |
|---|---|---|
| 2019/0182800 A1* | 6/2019 | Park ...................... H04W 76/30 |
| 2020/0236648 A1 | 7/2020 | Park et al. |
| 2021/0100017 A1* | 4/2021 | Chendamarai Kannan ................. H04W 72/541 |
| 2022/0029698 A1 | 1/2022 | Gaske |
| 2022/0137236 A1* | 5/2022 | Conflitti .................. G01S 19/36 342/357.25 |
| 2022/0225432 A1 | 7/2022 | Wang et al. |
| 2023/0006754 A1 | 1/2023 | Bellemare et al. |

* cited by examiner

DEVICES AND METHODS FOR BEAM TRACKING

CROSS-REFERENCE TO RELATED APPLICATION

This application is a continuation of U.S. application Ser. No. 17/890,793, entitled "DEVICES AND METHODS FOR BEAM TRACKING," filed on Aug. 18, 2022, which is herein incorporated by reference in its entirety.

BACKGROUND

The present disclosure relates generally to wireless communication, and more specifically to tracking wireless signal beams transmitted by communication nodes.

User equipment (e.g., a mobile communication device) may transmit and receive wireless signals (e.g., carrying user data) to and from a communication hub (e.g., a gateway, a base station, or a network control center) via a communication node (e.g., a non-terrestrial station, a satellite, and/or a high-altitude platform station). For instance, the communication hub may transmit a wireless "hub" signal to the communication node, and the communication node may relay the hub signal to the user equipment via a downlink beam. The user equipment may transmit a user signal to the communication node via an uplink beam, and the communication node may relay the user signal to the communication hub. The communication node may emit multiple beams (e.g., including the uplink beam and the downlink beam) to cover different geographical areas. However, coverage of beam may change over a period of time (e.g., due to movement of the communication node). This may create challenges for the user equipment to keep tracking a desired beam (e.g., a default beam) during communications with the communication node.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes one or more antennas, a receiver coupled to the one or more antennas, and processing circuitry coupled to the receiver and configured to receive multiple beams emitted by a communication node via the receiver at a first communication cycle that includes multiple beam time slots, store a broadcast interval corresponding to a first signal received using a first beam in a first beam time slot of the multiple beam time slots at a second communication cycle, and receive a second signal via the receiver using a second beam in a second beam time slot of the multiple beam time slots based on the broadcast interval at a third communication cycle.

In another embodiment, a non-transitory, computer-readable medium includes instructions that, when executed by processing circuitry, cause the processing circuitry to synchronize to a communication node for receiving multiple beams emitted by the communication node at a first cycle, determine a time shift and a frequency shift associated with each of the multiple beams, receive data samples of a first signal using a first beam in a first beam time slot of multiple beam time slots at a second cycle, adjust the data samples based on the time shift and frequency shift corresponding to the first beam in the first beam time slot, store a broadcast interval corresponding to the first signal, and receive a second signal using a second beam in a second beam time slot of the multiple beam time slots based on the broadcast interval at a third cycle.

In yet another embodiment, an electronic device includes a transceiver and processing circuitry communicatively coupled to the transceiver and configured to receive multiple beams emitted by a communication node using the transceiver at a first communication cycle that includes multiple beam time slots, store a broadcast interval corresponding to a first signal received using a first beam in a first beam time slot based on a preamble detection for each of the multiple beam time slots at a second communication cycle, and receive a second signal using a second beam in a second beam time slot based on the broadcast interval at a third communication cycle.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
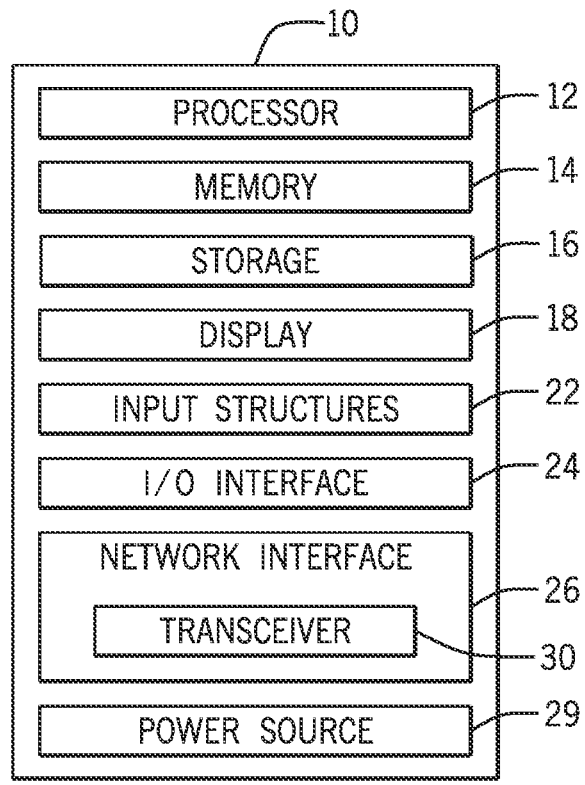
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to a communication system having a user equipment, a communication node, and a communication hub. The user equipment uses the communication node for bi-directional communication by relaying signals from the user equipment to the communication hub via the communication node, and vice versa. The communication node may emit multiple beams to cover different geographical areas. Each beam may transmit downlink signals to the user equipment or receive uplink signals from the user equipment. Due to certain constraints (e.g., battery power of the communication node), the multiple beams may not be emitted simultaneously. For instance, a time-division multiplexing (TDM) method may be used such that different beams are emitted in different beam time slots at different time periods (communication cycles). Each communication cycle may correspond to a signal frame, which may include multiple fields, such as a preamble and broadcast interval (BI) followed by broadcast (BCAST) and unicast (UCAST) data for each beam spread in a TDM manner.

Coverage of beam may change over a period of time (e.g., due to movement of the communication node). This may create challenges for the user equipment to track a desired beam (e.g., a default beam). To reduce the overhead message (e.g., user equipment location data) exchange between the user equipment and the communication node and/or the communication hub, it may be desirable to facilitate determining the desired beam for the user equipment at a given point in time, at a given geographical location, and for a given communication node.

To determine the desired beam, the user equipment may perform a beam search at the beginning of a synchronization process in which the user equipment synchronizes to the given communication node. The user equipment may receive a synchronization request from a device (e.g., Layer 1 (L1) controller) corresponding to an upper layer (e.g., logic link control (LLC) layer). The synchronization request may include a communication node identifier (ID) associated with the given communication node. Based on the communication node ID, the user equipment may extract radio parameters (e.g., root sequence, spreading code, or scrambling code) for the beam search and other relevant information from stored data (e.g., in a database) of the user equipment.

At a communication cycle (e.g., cycle N), with an assumption that the given communication node transmits signals at a configured number (e.g., a maximum configured number) of beam time slots (e.g., 1 or more slots, 2 or more slots, 4 or more slots, 6 or more slots, 8 or more slots, and so on), the user equipment may perform the following operations. The user equipment may receive radio frequency (RF) I/Q samples (or in-phase and/or quadrature samples) streaming for each possible beam preamble locations in time. For each received I/Q sample associated with different beams in different beam time slots, the user equipment may perform preamble detection and determine signal conditions, such as a detected preamble status (e.g., detected or not detected), an indication of signal strength (e.g., a received signal strength indicator (RSSI)), an indication of signal quality (e.g., a signal-to-noise ratio (SNR)), or the like. Among the detected preambles associated with different beams in different beam time slots for the cycle N, the user equipment may determine a first beam ID associated with a first beam and a first beam time slot in which the first beam is emitted based on signal conditions (e.g., received signal strength, such as highest received signal strength, detected beam time slot, such as first detected beam time slot, or the like). While performing signal receptions for all beam time slots one by one, the user equipment may determine a time shift and a frequency shift (e.g., Doppler shift) based on a global navigation satellite system (GNSS) time (e.g., a Global Positioning System (GPS) time) for each beam time slot, user equipment position, and communication node two-line element (TLE) set. The time shift and frequency shift may be used to compensate time and frequency offsets induced by distance and velocity of the given communication node with respect to the user equipment.

At the next communication cycle (e.g., cycle N+1), the user equipment may perform the following operations. The user equipment may receive I/Q samples at designated time corresponding to the first beam time slot. After detecting the preamble, the user equipment may decode the broadcast interval (BI) subsequent to the preamble. If the BI is not decoded, the user equipment may perform the same operations (e.g. described above with respect to cycle N) at next cycle. If the BI is decoded, the user equipment may retrieve yaw information from the decoded BI which may indicate orientation of the given communication node. Based on the yaw information, a GNSS time for an upcoming cycle (e.g., cycle N+2), and a user equipment location, the user equipment may determine a second beam ID associated with a second beam and a second beam time slot during which the second beam is emitted. For this operation, the user equipment may utilize stored data (e.g., radio parameters) and a mathematical model simulating communication node movement to determine the second beam ID and the second beam time slot. If the second beam ID and beam time slot are same as the first beam and beam time slot (e.g., based on signal conditions), the user equipment may continue using the first beam for data communications. If the second beam ID and beam time slot are different than the first beam and beam time slot, at cycle N+2 the user equipment may switch to the second beam in the second beam time slot and perform the operations described above (e.g., detecting the preambles, decoding the BIs, determining a second beam for next cycle based on the yaw, the GNSS time, and the user equipment location, and continuing using the current beam or switching to a different beam at the next cycle). While performing signal receptions for the first beam time slot at cycle N+1, the user equipment may determine a time shift and a frequency shift based on the GNSS time for the first beam time slot, the user equipment position, and the communication node TLE set. The user equipment may use the time shift and the frequency shift to compensate for time and frequency offsets induced by the distance and the velocity of the given communication node with respect to the user equipment.

With the foregoing in mind, FIG. 1 is a block diagram of user equipment 10 (e.g., an electronic device or a mobile communication device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable the user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a peer-to-peer connection, a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, New Radio (NR) cellular network, $6^{th}$ generation (6G) cellular network and beyond, a satellite connection (e.g., via a satellite network), and so on. In particular, the network interface 26 may include, for example, one or more interfaces for using a Release-15 cellular communication standard of the 5G specifications that include the millimeter wave (MM Wave) frequency range (e.g., 24.25-300 gigahertz (GHz)). The network interface 26 of the user equipment 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, UWB network, alternating current (AC) power lines, and so forth. The network interface 26 may, for instance, include a transceiver 30 for communicating signals using one of the aforementioned networks. The power source 29 of the user equipment 10 may include any suitable source of power, such as a rechargeable lithium polymer (Li-poly) battery and/or an alternating current (AC) power converter.

Figure 2:
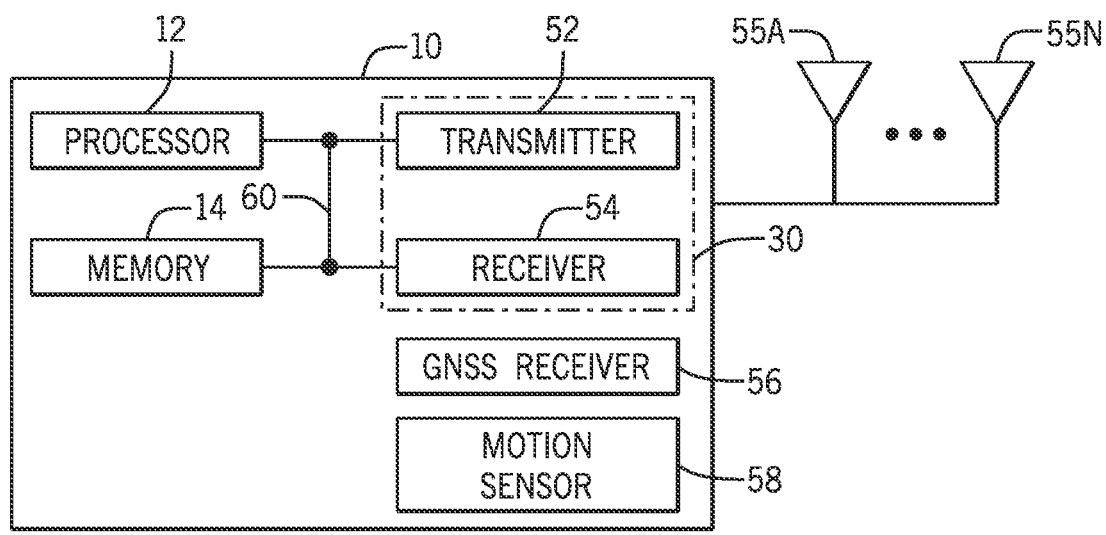
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55), and/or a global navigation satellite system (GNSS) receiver 56 may be communicatively coupled directly or indirectly (e.g., through or via another component, a communication bus, a network) to one another to transmit and/or receive signals between one another.

The user equipment 10 may include the transmitter 52 and/or the receiver 54 that respectively transmit and receive signals between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. For example, the user equipment 10 may include a first transceiver to send and receive messages using a first wireless communication network, a second transceiver to send and receive messages using a second wireless communication network, and a third transceiver to send and receive messages using a third wireless communication network, though any or all of these transceivers may be combined in a single transceiver. In some embodiments, the transmitter 52 and the receiver 54 may transmit and receive information via other wired or wireline systems or means.

The user equipment 10 may include the GNSS receiver 56 that may enable the user equipment 10 to receive GNSS signals from a GNSS network that includes one or more GNSS satellites or GNSS ground stations. The GNSS signals may include a GNSS satellite's observation data, broadcast orbit information of tracked GNSS satellites, and supporting data, such as meteorological parameters, collected from co-located instruments of a GNSS satellite. For example, the GNSS signals may be received from a Global Positioning System (GPS) network, a Global Navigation Satellite System (GLONASS) network, a BeiDou Navigation Satellite System (BDS), a Galileo navigation satellite network, a Quasi-Zenith Satellite System (QZSS or Michibiki) and so on. The GNSS receiver 56 may process the GNSS signals to determine a global position of the user equipment 10.

The user equipment 10 may include one or more motion sensors 58 (e.g., as part of the input structures 22). The one or more motion sensors (collectively referred to as "a motion sensor 58" herein) may include an accelerometer, gyroscope, gyrometer, and the like, that detect and/or facilitate determining a current location of the user equipment, an orientation (e.g., including pitch, yaw, roll, and so on) and/or motion of the user equipment 10, a relative positioning (e.g., an elevation angle) between the user equipment 10 and a communication node.

As illustrated, the various components of the user equipment 10 may be coupled together by a bus system 60. The bus system 60 may include a data bus, for example, as well as a power bus, a control signal bus, and a status signal bus, in addition to the data bus. The components of the user equipment 10 may be coupled together or accept or provide inputs to each other using some other mechanism.

As discussed above, the user equipment 10 may transmit a signal, via the transmitter 52, directed to a communication node for subsequent transmission to a communication hub. For example, the user equipment 10 may transmit different signals at a transmission power to enable successful receipt of the signals by the communication node. However, in response to determining that the communication node does not successfully receive the signal (e.g., due to a non-functional reverse beam), the user equipment 10 may switch to a second communication node and re-transmit the signal to the second communication node, such as until the user equipment 10 determines that the second communication node successfully receives the signal (e.g., in response to receipt of an acknowledgement signal from the second communication node).

Figure 3:
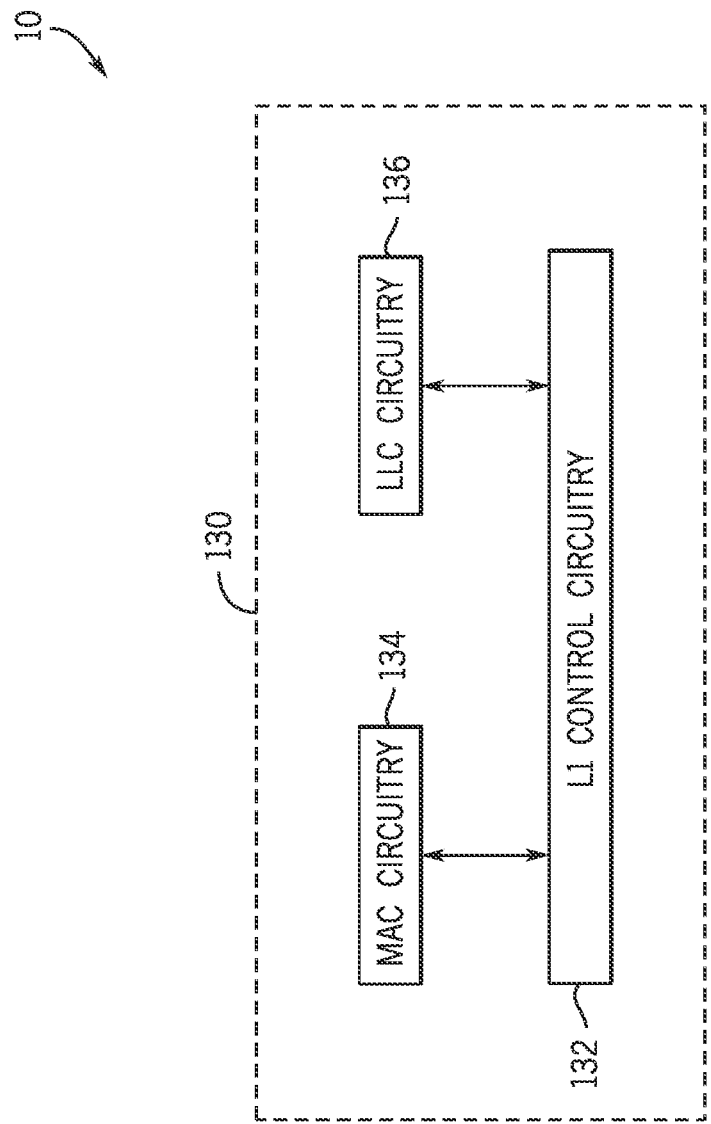
FIG. 3 is a schematic diagram of circuitry of the user equipment of FIG. 1, according to embodiments of the present disclosure.

FIG. 3 is a schematic diagram of circuitry 130 of the user equipment 10. As an example, the circuitry 130 may include data processing circuitry of the processor 12. The circuitry 130 may include Layer 1 (L1) control circuitry 132 (e.g., an L1 controller), media access control (MAC) circuitry 134, and logic link control (LLC) circuitry 136. Each of the MAC circuitry 134 and the LLC circuitry 136 may be communicatively coupled to the L1 control circuitry 132.

In some embodiments, the L1 control circuitry 132 may operate based on information received from the MAC circuitry 134 and/or the LLC circuitry 136. For example, the MAC circuitry 134 and/or the LLC circuitry 136 may receive (e.g., download) communication node information from a communication network (e.g., the Internet). The communication node information may include communication node identifiers (e.g., communication node identification information) associated with multiple communication nodes that may be used by the user equipment 10 for communications, beam identifiers (e.g., beam identification information) associated with beams emitted by each communication node, beam time slot information (e.g., a total number of beam time slots, beam distribution and timing in different beam time slots), radio parameters (e.g., root sequence, spreading code, or scrambling code) of the fields (e.g., preamble, broadcast interval, broadcast (BCAST) and unicast (UCAST) data) associated with each beam, beam status information (e.g., functional or non-functional), and/or any other relevant information (e.g., timing, orbit, elevation). The communication node information may be updated based on a predetermined frequency or cycle. For instance, the user equipment 10 may communicatively couple to the communication network periodically (e.g., on a daily basis, a weekly basis, after any suitable number of days or weeks, and so on), to download and/or receive updated communication node information. The MAC circuitry 134 and/or the LLC circuitry 136 may also receive other relevant information, such as a global position of the user equipment 10 from the GNSS receiver 56, orientation information (e.g., pitch, yaw, roll, and so on) and/or motion of the user equipment 10 from the motion sensor 58, relative positioning information (e.g., a distance, an elevation angle) between the user equipment 10 and the communication node, and so on. The user equipment 10 may store the communication node information in the memory 14 or the storage 16 (e.g., in the form of a database).

In a process of determining a desired beam associated with a communication node for data communication, the user equipment 10 may perform a beam search at the beginning of a synchronization process in which the user equipment 10 synchronizes to the communication node. For example, the user equipment 10 may receive a synchronization request from a device (e.g., the L1 controller) corresponding to an upper layer (e.g., logic link control (LLC) layer). The synchronization request may include a communication node identifier associated with the communication node. Based on the communication node identifier, the user equipment 10 may extract the radio parameters associated with each beam emitted by the communication node for the beam search and the other relevant information from stored data (e.g., in the database) of the user equipment 10.

In some embodiments, the L1 control circuitry 132 may cause the transceiver 30 to receive a signal from the desired beam determined based on the data received from the MAC circuitry 134 and/or the LLC circuitry 136. For example, the MAC circuitry 134 may communicate with the L1 control circuitry 132 to indicate that the signal is to be received by the user equipment 10 (e.g., as a downlink signal) from the communication node at a designated time corresponding to the desired beam. Moreover, the MAC circuitry 134 may provide information indicating signal frame structure and cycle, such as a time duration of each data sample, sequence of fields in each data sample, a time duration of each field, and so on. Furthermore, the LLC circuitry 136 may provide additional information (e.g., a current location of the user equipment 10, orientation information of the user equipment 10, relative positioning between the user equipment 10 and the communication node). In some embodiments, the MAC circuitry 134 and/or the LLC circuitry 136 may provide such information with updates to the L1 control circuitry 132 at a predetermined frequency or communication cycle. Thus, the L1 control circuitry 132 may continually receive updated information from the MAC circuitry 134 and/or the LLC circuitry 136 and may readily utilize the updated information when the L1 control circuitry 132 is to cause the transceiver 30 to receive the signal (e.g., in a radio frequency signal) from the communication node.

Figure 4:
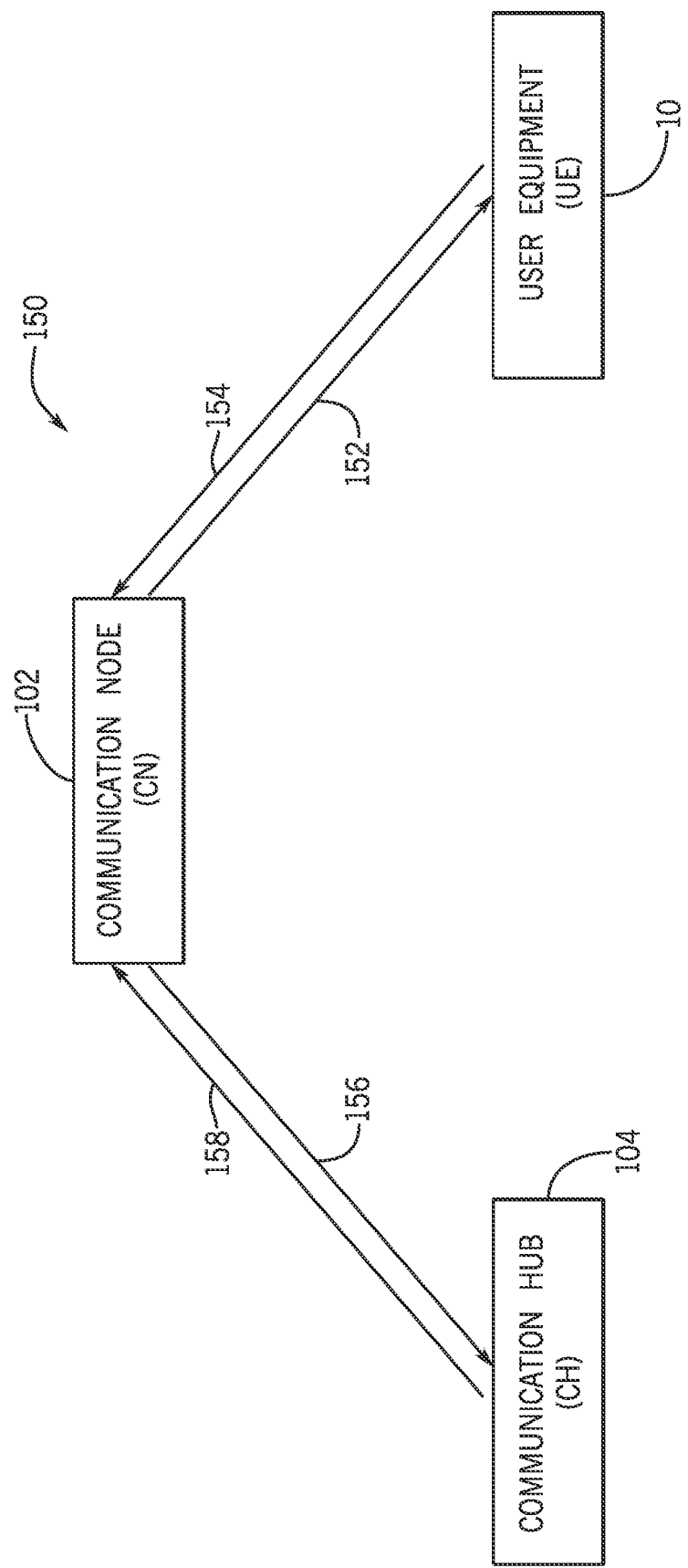
FIG. 4 is a schematic diagram of a communication system having a communication hub, a communication node, and the user equipment of FIG. 1, according to embodiments of the present disclosure.

With the preceding in mind, FIG. 4 is a schematic diagram of a communication system 150 using a communication node for signal transmissions with the user equipment of FIG. 1, according to embodiments of the present disclosure. The communication system 150 includes the user equipment 10, a communication node 102, and a communication hub 104. The communication node 102 may include base stations, such as Next Generation NodeB (gNodeB or gNB) base stations that provide 5G/NR coverage to the user equipment 10, Evolved NodeB (eNodeB) base stations and may provide 4G/LTE coverage to the user equipment 10, and so on. Additionally or alternatively, the communication node 102 may include non-terrestrial base stations, high altitude platform stations, airborne base stations, space borne base stations, a satellite, or any other suitable nonstationary communication devices, communicatively coupled to the user equipment 10.

The communication node 102 may be communicatively coupled to the communication hub 104, which may include another electronic device, such as a terrestrial base station, a ground station, a call center, and so forth, to enable communication of signals between the communication hub 104 and the user equipment 10 via the communication node 102. For example, the user equipment 10, using its transceiver 30, may transmit a signal to the communication node 102, and the communication node 102 may forward the signal to the communication hub 104. Additionally or alternatively, the communication hub 104 may transmit a signal to the communication node 102, and the communication node 102 may forward the signal to the user equipment 10 for receipt, using its transceiver 30. In some embodiments, the transceiver 30 may include a software-defined radio that enables communication with the communication node 102. For example, the transceiver 30 may be capable of communicating via a first communication network (e.g., a cellular network), and may be capable of communicating via a second communication network (e.g., a non-terrestrial network) when operated by software (e.g., stored in the memory 14 and/or the storage 16 and executed by the processor 12).

At each communication cycle (e.g., time period designated for communication between the user equipment 10 and the communication node 102), the user equipment 10 may synchronize to the communication node 102 to establish a connection for bi-directional communication. The communication node 102 may emit multiple beams to cover different geographical areas. Each beam may be used to transmit downlink signals to the user equipment 10 or receive uplink signals from the user equipment 10. For example, the user equipment 10 may transmit an uplink signal to the communication node 102 via a beam 152 (e.g., a reverse beam that receives the uplink signal), and receive a downlink signal from the communication node 102 via a beam 154 (e.g., a forward beam that transmits the downlink signal to the user equipment 10). The communication node 102 may also synchronize to the communication hub 104 to establish a connection for bi-direction communication. For example, the communication node 102 may relay the uplink signal to the communication hub 104 via a beam 156 (e.g., a communication-node-to-communication-hub beam), and receive a communication hub signal (e.g., a signal in response to the uplink signal sent from the user equipment 10) from the communication hub 104 via a beam 158 (e.g., a communication-hub-to-communication-node beam).

Coverage of beam may change over a period of time (e.g., due to movement of the communication node 102). For example, at a given communication cycle, the user equipment 10 may receive downlink signals with desired signal quality (e.g., signal strength, signal-to-noise ratio) using a first beam when the communication node 102 is at a first position. However, at the next communication cycle, the first beam may not provide downlink signals with desired signal quality when the communication node 102 is at a second position, and the user equipment 10 may switch to a second beam to maintain a reliable connection with the communication node 102. In some embodiments, the user equipment 10 may track a desired beam (e.g., a default beam) at each communication cycle while synchronized to the communication node 102. To reduce the overhead message (e.g., user equipment 10 location data) exchange between the user equipment 10 and the communication hub 104, it may be desirable to facilitate determining the desired beam for the user equipment 10 at a given point in time, at a given geographical location, and for a given communication node (e.g., the communication node 102).

Figure 5:
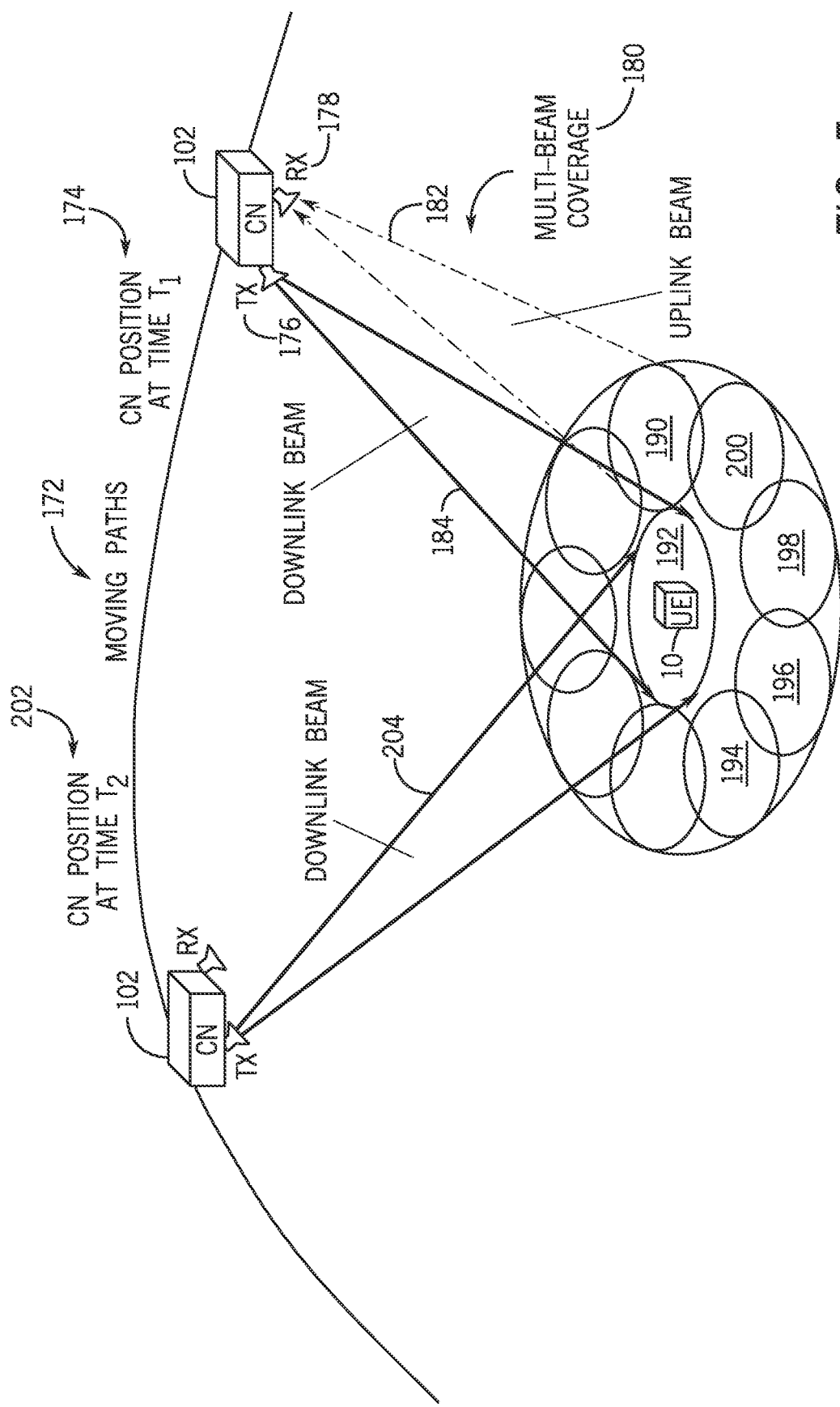
FIG. 5 is a schematic diagram of the communication system of FIG. 4 using multi-beam coverage for signal communication with the user equipment of FIG. 1, according to embodiments of the present disclosure.

FIG. 5 is a schematic diagram of the communication system 150 of FIG. 4 using multi-beam coverage for signal transmissions with the user equipment 10 of FIG. 1, according to embodiments of the present disclosure. As illustrated, the communication node 102 may move along one or more moving paths 172 (e.g., orbits of the Earth). For example, at time $T_1$, the communication node is at a position 174. The communication node 102 may include a transmitter (TX) 176 and a receiver (RX) 178, which may be similar in structure and function to the transmitter 52 and the receiver 54 of the user equipment 10, respectively. At the position 174, the communication node 102 may utilize the transmitter 176 and receiver 178 to emit multiple beams (e.g., downlink beams that transmit downlink signals, uplink beams that receive uplink signals) covering same or different areas. The multiple beams may be emitted in different beam time slots distributed or spread in a time-division multiplexing (TDM) manner. For example, the communication node 102 may have multi-beam coverage 180 within which the communication node 102 may receive an uplink signal using an uplink beam (e.g., an uplink beam 182) in one beam time slot from the user equipment 10 or transmit a downlink signal using a downlink beam (e.g., a downlink beam 184) in another beam time slot to the user equipment 10. Each beam may cover a geographical area (e.g., area 190, 192, 194, 196, 198, 200, and so on) on the surface of the Earth. For example, the uplink beam 182 covers the area 190 and the downlink beam 184 covers the area 192. Some areas may overlap with one or more neighboring areas. For example, the areas 192 may overlap with other areas, such as areas 190, 194, and 200. While only two beams 182, 184 are illustrated as being emitted from the communication node 102 at time $T_1$, it should be understood that any suitable of beams may be emitted (e.g., 2 or more, 3 or more, 4 or more, 6 or more, 8 or more, 12 or more, and so on). At time $T_2$, the communication node 102 moves to a position 202. The communication node 102 may continue utilizing the transmitter 176 and receiver 178 to emit multiple beams. For example, the transmitter 176 may emit a downlink beam 204 that covers the area 192. While only one beam 204 is illustrated as being emitted from the communication node 102 at time $T_2$ for exemplary purposes it should be understood that any suitable of beams may be emitted.

At the time $T_1$, the user equipment 10 may be at a location within the multi-beam coverage 180. In some cases, one or more areas corresponding to different beams may cover the location of the user equipment 10. In the illustrated example, the areas 190, 192, and 200 cover the location of the user equipment 10. The user equipment 10 may determine a first desired beam (e.g., the downlink beam 184 covering the area 192) that is more suitable than other beams (e.g., beams covering the areas 190 and 200) based on detected downlink signals (e.g., detected preambles of the downlink signals). As the communication node 102 moves toward the position 202, the user equipment 10 may receive I/Q samples at a designated time corresponding to the downlink beam 184. The user equipment 10 may decode a broadcast interval in each I/Q sample to retrieve certain information (e.g., yaw information) associated with the communication node 102. Based on the decoded broadcast interval and other relevant information (e.g., a GNSS time and a location of the user equipment 10, the radio parameters, and a predicated movement of the communication node 102), the user equipment 10 may determine a second desired beam (e.g., the downlink beam 204) that is suitable for data communications at time $T_2$.

Figure 6:
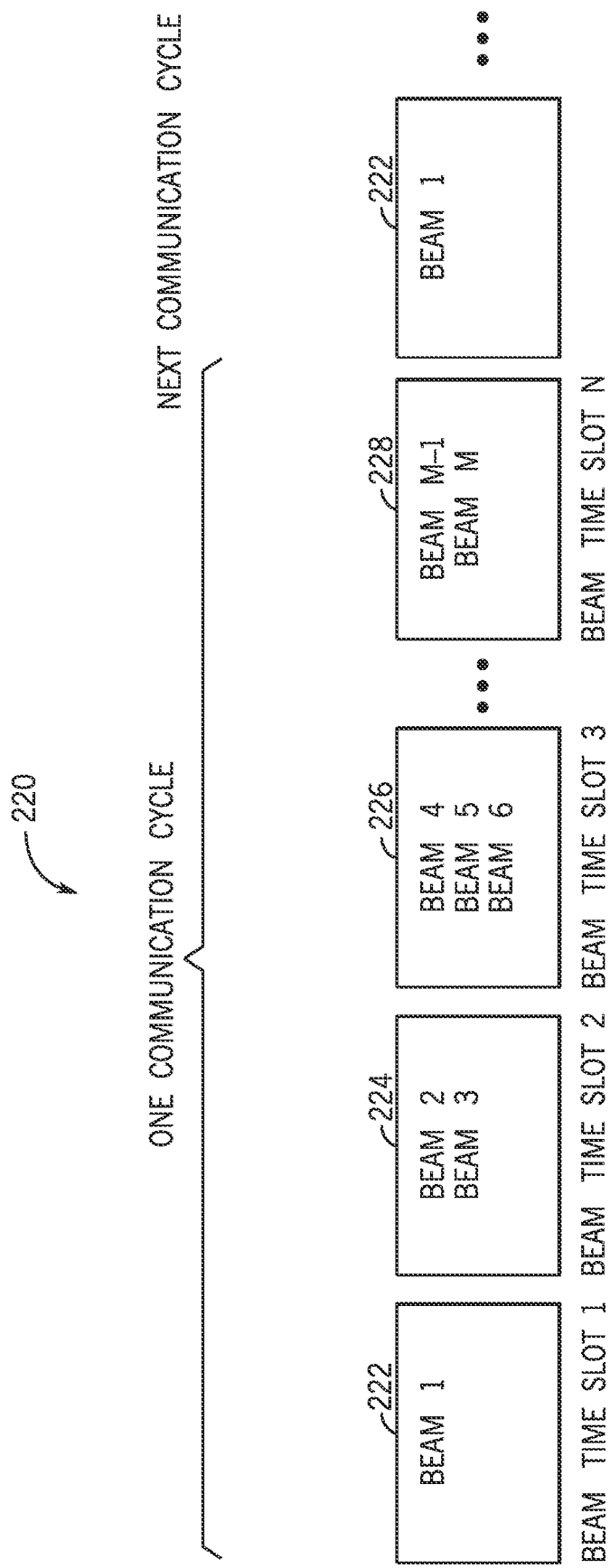
FIG. 6 is a timing diagram of communicating with multiple beams spread among multiple beam time slots in one communication cycle, according to embodiments of the present disclosure.

FIG. 6 is a block diagram of multiple beams spread among multiple beam time slots in one communication cycle 220, according to embodiments of the present disclosure. As mentioned previously, the communication node 102 may emit multiple beams to cover different geographical areas. Each beam may be used to transmit downlink signals to the user equipment 10 or receive uplink signals from the user equipment 10. Due to certain constrains (e.g., battery power of the communication node 102), the multiple beams may not be emitted simultaneously. In some embodiments, a time-division multiplexing (TDM) method may be used such that different beams are emitted during different beam time slots at each communication cycle. For example, at communication cycle 220, M beams may be emitted and distributed or spread among N beam time slots. As illustrated, beam 1 is emitted during beam time slot 222, beams 2 and 3 are emitted during beam time slot 224, beams 4, 5, and 6 are emitted during beam time slot 226, and beams M-1 and M may be emitted during beam time slot 228. In each beam time slot that includes multiple beams, the multiple beams may be emitted at similar or different time within that beam time slot. As such, multiple signals may be received during each communication cycle, which may include signal frame structures having multiple fields, such as a preamble and broadcast interval (BI) followed by broadcast (BCAST) and unicast (UCAST) data for each beam spread in a TDM manner.

At each communication cycle, the user equipment 10 may use a predetermined beam (e.g., a downlink beam determined in the previous communication cycle) to receive the downlink signals. Based on processed (e.g., decoded) downlink signals and other relevant information (e.g., the GNSS time and location of the user equipment 10, the radio parameters, the predicated movement of the communication node 102), the user equipment 10 may determine a desired beam for the next communication cycle. If the desired beam is the same as the predetermined beam, the user equipment 10 may continue using the predetermined beam at the next communication cycle. If the desired beam is different from the predetermined beam, then the user equipment 10 may switch to the desired beam at the next communication cycle. In this way, the user equipment 10 may continue tracking a desired beam, or switch to a better performing beam, to maintain reliable data communications with the communication node 102.

Figure 7:
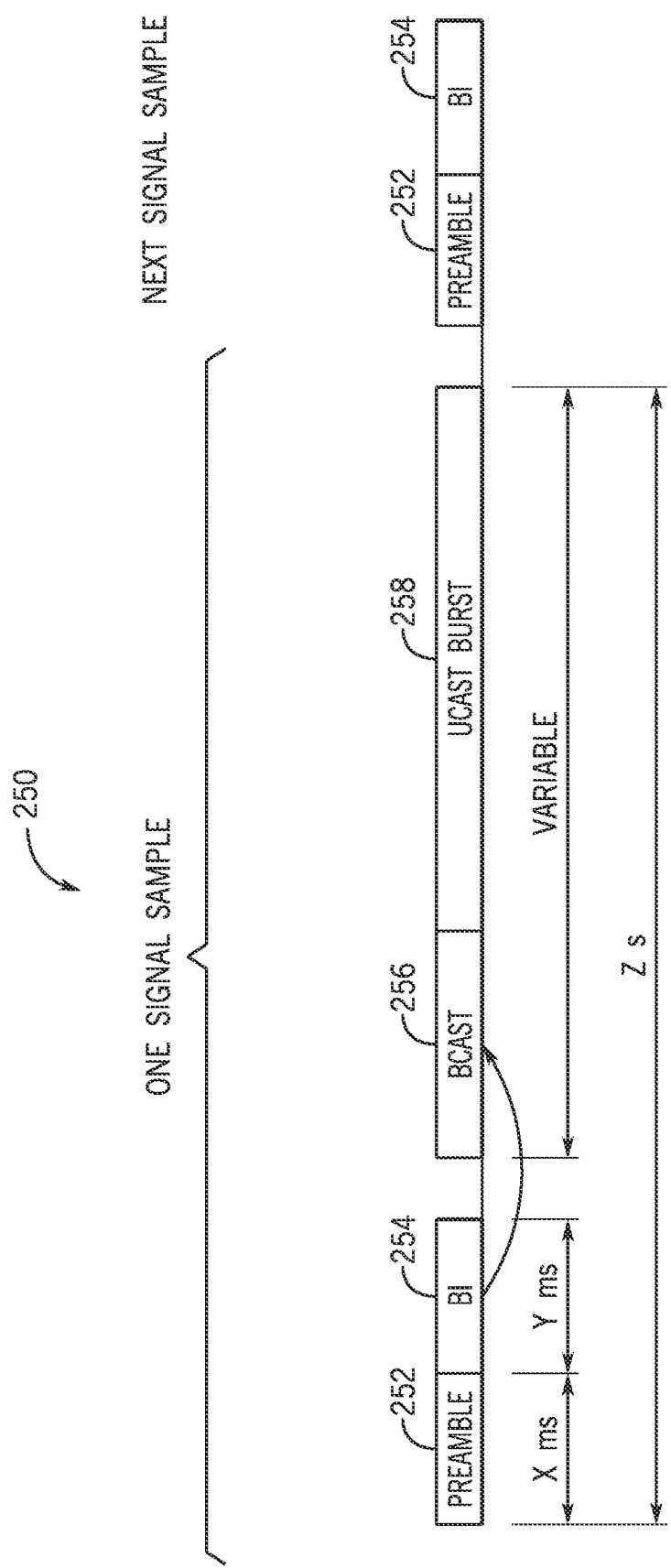
FIG. 7 is a schematic diagram of signal frame structure and cycle for signals transmitted by a communication node and received by the user equipment of FIG. 4, according to embodiments of the present disclosure.

FIG. 7 is a schematic diagram of signal frame structure and cycle for signals transmitted by the communication node 102 and received by the user equipment 10 of FIG. 1, according to embodiments of the present disclosure. As mentioned above, the user equipment 10 may receive a downlink signal from a communication node (e.g., communication node 102) via a downlink beam (e.g., downlink beam 184 or 204). The downlink signal may be configured based on certain communication parameters (e.g., radio parameters including root sequence, spreading code, and scrambling code) associated with the downlink beam. The communication parameters may be received (e.g., downloaded) by the MAC circuitry 134 and/or the LLC circuitry 136 from a communication network (e.g., the Internet) and saved in a database in the memory 14 or the storage 16. The communication network may update the communication parameters based on a predetermined frequency or cycle. For instance, the user equipment 10 may communicatively couple to the communication network periodically (e.g., on a daily basis, a weekly basis, after any suitable number of days or weeks, and so on) to download updated communication parameters.

The downlink signal may include multiple signal samples, such as the signal sample 250, each having a preamble 252, a broadcast interval (BI) 254, a broadcast (BCAST) section 256, and a unicast (UCAST) section 258. The preamble 252 may facilitate synchronizing transmission timing between the user equipment 10 and the communication node 102. The preamble 252 may be located at a beginning section of the downlink signal and have a time duration (e.g., X milliseconds (ms), which may include 5 seconds or less, 2 seconds or less 1 second or less, 500 ms or less, 100 ms or less, 50 ms or less, 10 ms or less, and so on). The broadcast interval 254 may follow the preamble 252 in the downlink signal and have a time duration (e.g., Y ms, which may include 5 seconds or less, 2 seconds or less, 1 second or less, 500 ms or less, 100 ms or less, 50 ms or less, 10 ms or less, and so on). The broadcast interval 254 may include communication node information (e.g., position, orientation, and so on) that may be decoded by the user equipment 10. For example, the decoded broadcast interval 254 may include orientation information (e.g., yaw information) associated with the communication node 102. The broadcast (BCAST) section 256 and the unicast (UCAST) section 258 may include or be associated with payload or user data (e.g., data used in various forms of communication, such as emergency text messaging, emergency voice calling, acknowledgement messaging, video streaming, internet browsing, and so forth). The broadcast (BCAST) section 256 and the unicast (UCAST) section 258 may have a variable time duration (e.g., depending on the data content, which may include 5 seconds or less, 2 seconds or less, 1 second or less, 500 ms or less, 100 ms or less, 50 ms or less, 10 ms or less, and so on). Each subsequent signal sample may have a time interval (e.g., Z second (s), which may include 10 seconds or less, 5 seconds or less, 2 seconds or less, 1 seconds or less, and so on) with respect to a preceding signal sample (e.g., the time interval may be measured based on a time difference between the preamble 252 of the first and the second signal samples).

Figure 8:
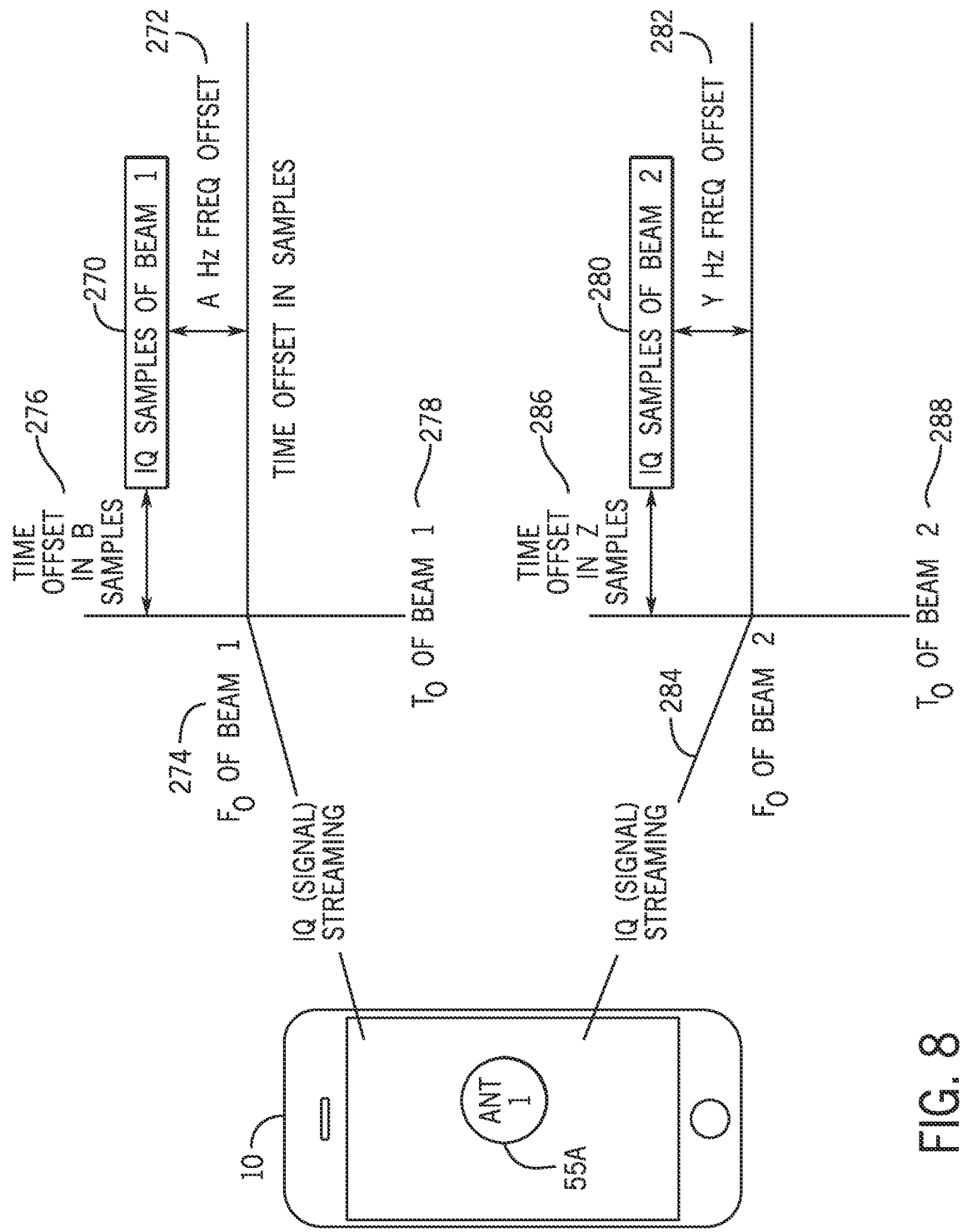
FIG. 8 is a set of timing diagrams of the user equipment of FIG. 1 using an antenna to receive signals from two beams, according to embodiments of the present disclosure.

The user equipment 10 may receive downlink signals having the frame structure and cycle described in FIG. 7 from a communication node 102 at an antenna (e.g. antenna 55). FIG. 8 is a schematic diagram of the user equipment 10 (e.g., a mobile phone) of FIG. 1 using the antenna 55A to receive signals from two beams, according to embodiments of the present disclosure. Each received signal may include streamed data such as IQ samples (or in-phase and/or quadrature samples) received at the antenna 55A (Ant 1), or one or more antennas 55. In radio frequency (RF) applications, a pair of periodic signals may be referred to be in "quadrature" when they differ in phase (e.g., by 90 degrees). The "in-phase" or reference signal is referred to as 'I,' and the signal that is shifted by 90 degrees (the signal in quadrature) is referred to as 'Q.'

For example, the received signal from beam 1 may include an IQ sample 270. The processing circuitry 130 may analyze the IQ samples 270 and determine that the IQ samples 270 may be offset by frequency and time due to the movement of the communication node 102, the movement of the user equipment 10, or both. As such, the processing circuitry 130 may analyze the IQ samples 270 in a frequency domain (e.g., using Fourier transform or fast Fourier transform (FFT)) to determine a frequency offset 272 (e.g., in A Hertz (hz)) with respect to a central frequency of beam 1 ($F_{0\ of\ beam\ 1}$) 274. Additionally, the processing circuitry 130 may analyze the IQ samples 270 in a time domain to determine a time offset 276 (e.g., in B samples) with respect to a starting time of beam 1 ($T_{0\ of\ beam\ 1}$) 278. Similarly, the received signal from beam 2 may include an IQ sample 280. The processing circuitry 130 may analyze the IQ samples 280 in the frequency domain to determine a frequency offset 282 (e.g., in Y Hertz (hz)) with respect to a central frequency of beam 2 ($F_{0\ of\ beam\ 2}$) 284. Additionally, the processing circuitry 130 may analyze the IQ samples 280 in the time domain to determine a time offset 286 (e.g., in Z samples) with respect to a starting time of beam 2 ($T_{0\ of\ beam\ 2}$) 288.

In some embodiments, the processing circuitry 130 may use a relative positioning between the communication node 102 and the user equipment 10 to determine the frequency offsets 272 and 282 and the time offsets 276 and 284. In one example, the relative positioning may include data from ephemeris data, such as various operating parameters that may be associated with movement (e.g., orbital location, orientation) of the communication node 102, movement of the Earth (e.g., a gravitational property, an orbit of the Earth), a historical positioning of the communication node 102, and the like. In another example, the relative positioning may include data from GNSS signals (e.g., received by the GNSS receiver 56), such as observation data, broadcast orbit information, and supporting data associated with GNSS satellites that may be used to determine a current location of the user equipment 10. In another example, the relative positioning may include data from orientation data received from the motion sensor 58 to determine an orientation of the user equipment 10.

Figure 9:
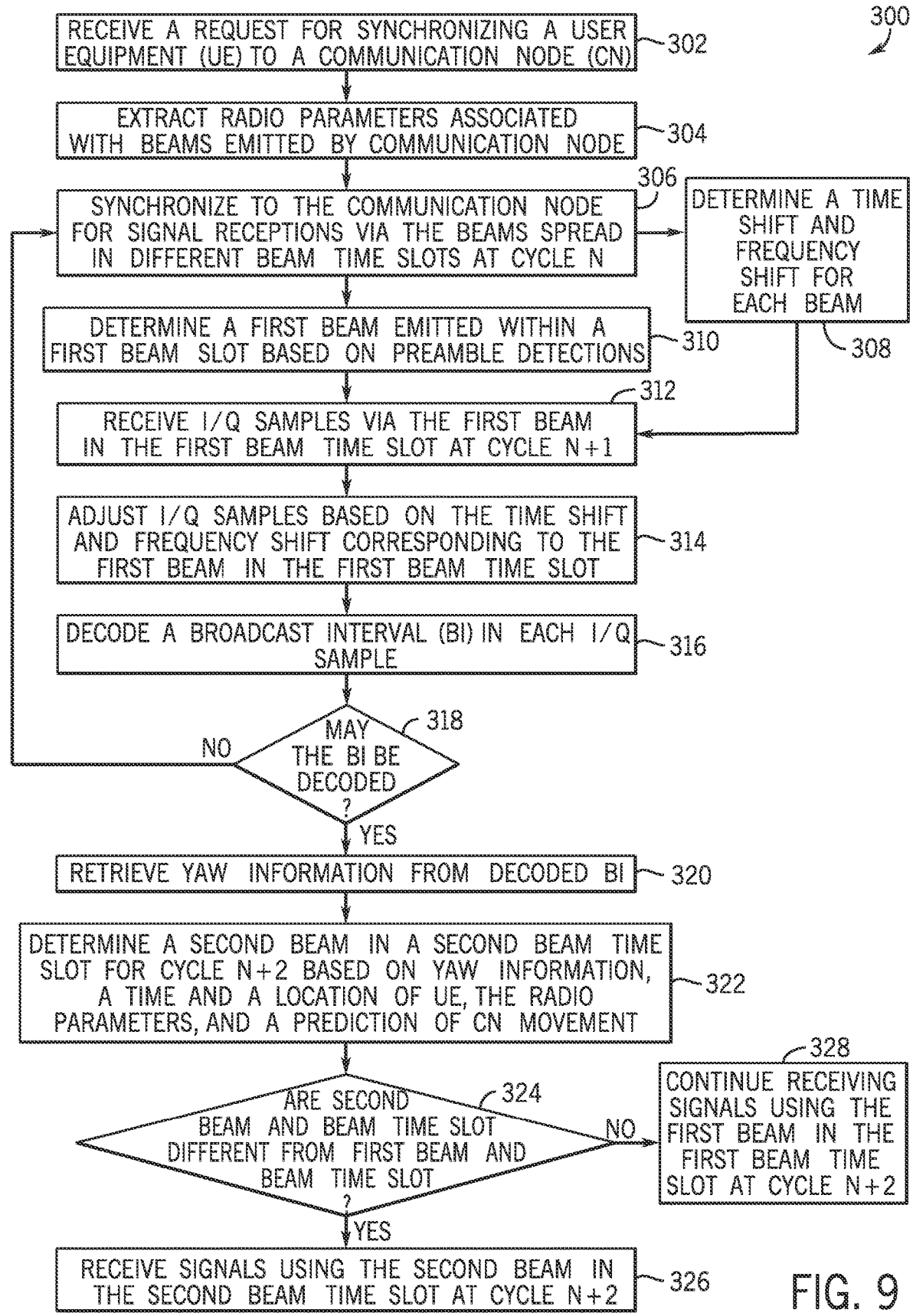
FIG. 9 is a flowchart of a method for continuously tracking a desired beam of the communication node of FIG. 4, according to embodiments of the present disclosure.

With the preceding in mind, FIG. 9 is a flowchart of a method 300 for continuously tracking a desired beam used for communications between the user equipment 10 and the communication node 102 of FIG. 4, according to embodiments of the present disclosure. Any suitable device (e.g., a controller) that may control components of the user equipment 10, such as the processor 12, may perform the method 300. In some embodiments, the method 300 may be implemented by executing instructions stored in a tangible, non-transitory, computer-readable medium, such as the memory 14 or storage 16, using the processing circuitry 130 of the processor 12. For example, the method 300 may be performed at least in part by one or more software components, such as an operating system of the user equipment 10, one or more software applications of the user equipment 10, and the like. While the method 300 is described using steps in a specific sequence, it should be understood that the present disclosure contemplates that the described steps may be performed in different sequences than the sequence illustrated, and certain described steps may be skipped or not performed altogether.

Before the user equipment 10 initiates signal communication, at block 302, the user equipment 10 receives a request for synchronizing the user equipment 10 to a communication node (e.g., communication node 102). For example, the user equipment 10 may receive the request from a device (e.g., the L1 controller) corresponding to an upper layer (e.g., logic link control (LLC) layer). The request may include a communication node identifier associated with the communication node 102.

Based on the communication node identifier, at block 304, the user equipment 10 extracts radio parameters associated with beams emitted by the communication node 102. For example, the user equipment 10 may use the L1 control circuitry 132 to extract the radio parameters from stored data (e.g., in a database) of the user equipment 10. The radio parameters may include root sequence, spreading code, and scrambling code associated with each beam emitted by multiple communication nodes including the communication node 102. The stored data may include radio parameters associated with each beam and other relevant data, such as communication node identifiers associated with the multiple communication nodes that may be used by the user equipment 10 for communications, beam identifiers associated with beams emitted by each communication node, beam time slot, beam status information (e.g., functional, or non-functional), and/or any other relevant information (e.g., timing, orbit, elevation). In some embodiments, the stored data may be received (e.g., downloaded) by the MAC circuitry 134 and/or the LLC circuitry 136 from a communication network (e.g., the Internet) and saved in the database in the memory 14 or the storage 16. The stored data may be updated based on a predetermined frequency or cycle. For instance, the user equipment 10 may connect to the communication network periodically (e.g., on a daily basis, a weekly basis, after any suitable number of days or weeks, and so on) to download latest radio parameters and other relevant data. The radio parameters may be used for a beam search described in detail below.

As mentioned previously, the user equipment 10 may receive downlink signals via different beams spread among multiple beams time slots at different communication cycles. With this in mind, at block 306, the user equipment 10 synchronizes to the communication node 102 for signal receptions via the beams spread among different beam time slots at cycle N (where N may be 1, 2, 3, 5, 10, 100, or any other suitable number). Each beam time slot may correspond to one or more beams being emitted. In each beam time slot in which multiple beams are emitted, different beams may be emitted at similar or different time. Each downlink signal associated with a corresponding beam may include multiple signal samples (e.g., I/Q samples), each having a structure with multiple fields, such as a preamble and a broadcast interval (BI) followed by a broadcast (BCAST) section and a unicast (UCAST) section.

At block 308, the user equipment 10 determines a time shift and a frequency shift (e.g., Doppler shift) for each beam. In some embodiments, for each received I/Q sample associated with a beam emitted within a beam time slot, the user equipment 10 may determine the time shift and the frequency shift based on a GNSS time for the beam time slot, a location of the user equipment 10, and two-line element (TLE) set of the communication node 102. The user equipment 10 may compensate for time and frequency offsets induced by distance and velocity of the communication node 102 with respect to the user equipment 10 by using the time shift and the frequency shift. The user equipment 10 may store the determined time shifts and frequency shifts associated with the beams spread among different beam time slots in the memory 14 or the storage 16 (e.g., in the form of a database).

While determining the time shift and the frequency shift for each beam, at block 310, the user equipment 10 determines a first beam emitted within a first beam time slot based on preamble detections. The preamble may be used to synchronize transmission timing between the user equipment 10 and the communication node 102. The preamble may be located at a beginning section of each I/Q sample in a downlink signal associated with a corresponding beam. For example, after synchronization, the user equipment 10 may receive I/Q samples via multiple beams emitted by the communication node 102 and spread among different beam time slots. For each received I/Q sample associated with a beam emitted in a corresponding beam time slot, the user equipment 10 may perform preamble detection that includes determining or identifying signal conditions, such as detected preamble status (e.g., detected or not detected), received signal strength indicator (RSSI), and signal-to-noise ratio (SNR). Among the detected preambles associated with different beams distributed among different beam time slots for the cycle N, the user equipment 10 may determine a first beam ID associated with a first beam and a first beam time slot during which the first beam is emitted based on signal conditions (e.g., highest received signal strength, or first detected beam time slot).

At block 312, the user equipment 10 receives I/Q samples via the first beam in the first beam time slot at cycle N+1. For instance, the user equipment 10 may receive the I/Q samples at a designated time corresponding to the first beam in the first beam time slot. The user equipment 10 may determine the designated time based on the radio parameters (e.g., root sequence, spreading code, or scrambling code) and other relevant data associated with the first beam. For example, the relevant data may include information indicating signal frame structure and cycle, such as a time duration of each I/Q sample, sequence of fields (e.g., preamble, broadcast interval, broadcast (BCAST) and unicast (UCAST) data) in each I/Q sample, a time duration of each field associated with the first beam and duration, and so on.

After receiving the I/Q samples via the first beam in the first beam time slot, at block 314, the user equipment 10 adjusts the I/Q samples based on the time shift and frequency shift corresponding to the first beam in the first beam time slot. The user equipment 10 may determine the time shift and the frequency shift (e.g., at block 308) and stored in the memory 14 or the storage 16 (e.g., in the form of a database). The user equipment 10 may use the time and frequency shifts to compensate time and frequency offsets induced by distance and velocity of the communication node 102 with respect to the user equipment 10.

Using adjusted I/Q samples, the user equipment 10 may determine or detect the preamble. After the preamble detection, at block 316, the user equipment 10 decodes the broadcast interval (BI) subsequent to the preamble. The broadcast interval may include communication node information (e.g., position, orientation, and so on) that may be decoded by the user equipment 10. For example, the decoded broadcast interval may include orientation information (e.g., yaw information) associated with the communication node 102. In some embodiments, the user equipment 10 may utilize the radio parameters (e.g., root sequence, spreading code, or scrambling code) associated with the broadcast interval to decode the broadcast interval.

At block 318, the user equipment determines whether the broadcast interval may be decoded. If the broadcast interval is decoded (e.g. at the block 316), at block 320, then the user equipment 10 retrieves yaw information from the decoded broadcast interval. If the broadcast interval is not decoded, then the user equipment 10 may start similar operations described at block 306 for the next communication cycle (e.g. cycle N+2).

At block 322, the user equipment 10 determines a second beam in a second beam time slot for the next cycle N+2 based on the yaw information, a time (e.g., a GNSS time) and a location of the user equipment 10, the radio parameters, and/or a predicted movement of the communication node 102. The decoded broadcast interval may include the yaw information indicating orientation of the communication node 102. In some embodiments, the user equipment 10 may determine the GNSS time and the location of the user equipment 10 based on data from GNSS signals (e.g., received by the GNSS receiver 56), such as observation data, broadcast orbit information, and supporting data associated with GNSS satellites. In some embodiments, the user equipment 10 may use the L1 control circuitry 132 to extract the radio parameters from stored data (e.g., in a database) of the user equipment 10.

To determine the predicted movement of the communication node 102, the user equipment 10 may utilize a mathematical model to simulate movement (e.g., orbital location, orientation) associate with the communication node 102. Based on the simulation, the user equipment 10 may predict the movement of the communication node 102 at the cycle N+2. The mathematical model may include various algorithms (e.g., moving object trajectory prediction algorithms) to simulate node movement based on various input data (e.g., from the stored data in the database), such as a relative positioning between the communication node 102 and the user equipment 10. For example, the relative positioning may include data from ephemeris data, such as various operating parameters that may be associated with movement of the communication node 102, movement of the Earth (e.g., a gravitational property, an orbit of the Earth), a historical positioning of the communication node 102, and the like.

At block 324, the user equipment 10 determines whether the second beam and beam time slot are different from the first beam and beam time slot. If the second beam and beam time slot are different from the first beam and beam time slot, at block 326, the user equipment 10 receives signals using the second beam in the second beam time slot for signal receptions at the cycle N+2. On the contrary, if the second beam and beam time slot are the same as the first beam and beam time slot, at block 328, the user equipment 10 continues receiving signals using the first beam in the first beam time slot at the cycle N+2.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:

a receiver; and processing circuitry coupled to the receiver, the processing circuitry configured to:

at a first communication cycle, cause the receiver to receive a first beam from a communication node in a first beam time slot; and at a second communication cycle, cause the receiver to receive a second beam, different from the first beam, in a second beam time slot based on information received in the first beam.

2. The user equipment of claim 1, wherein the information comprises orientation information associated with the communication node or predicted movement associated with the communication node, and wherein the processing circuitry is configured to, at the second communication cycle, determine the second beam in the second beam time slot based on the orientation information or the predicted movement.

3. The user equipment of claim 1, wherein the processing circuitry is configured to receive a request for synchronizing the user equipment to the communication node from a Layer 1 (L1) controller.

4. The user equipment of claim 3, wherein the request comprises a node identifier associated with the communication node.

5. The user equipment of claim 4, wherein the processing circuitry is configured to extract a plurality of radio parameters based on the node identifier.

6. The user equipment of claim 5, wherein the processing circuitry is configured to, at the second communication cycle, determine a beam identifier of the second beam based on the plurality of radio parameters, the information, and a mathematical model simulating movement of the communication node.

7. The user equipment of claim 1, wherein the communication node is configured to emit a plurality of beams comprising the first beam and the second beam in a time-division multiplexing (TDM) manner.

8. The user equipment of claim 1, wherein the processing circuitry is configured to determine a structure with multiple fields comprising a preamble, a broadcast interval (BI), a broadcast (BCAST) data section, and a unicast (UCAST) data section associated with the first beam or the second beam.

9. The user equipment of claim 8, wherein the processing circuitry is configured to determine one or more signal conditions associated with the first beam or the second beam, wherein the one or more signal conditions comprise a detected preamble status, a first indication of signal strength, or a second indication of signal quality.

10. The user equipment of claim 9, wherein the processing circuitry is configured to determine a first beam identifier associated with the first beam based on the signal conditions associated with the first beam.

11. A non-transitory, computer-readable medium comprising instructions that, when executed by processing circuitry of user equipment, cause the processing circuitry to:
receive data samples of a first signal in a first beam time slot emitted by a communication node at a first communication cycle associated with the user equipment;
adjust the data samples based on a time shift and a frequency shift associated with the first signal; and
receive a second signal using a second beam time slot based on the data samples as adjusted at a second communication cycle associated with the user equipment.

12. The non-transitory, computer-readable medium of claim 11, wherein the instructions cause the processing circuitry to:
determine the time shift and the frequency shift associated with the first signal based on a global navigation satellite system (GNSS) time, a location of the user equipment, and two-line element (TLE) set of the communication node; and
adjust the data samples based on the time shift and the frequency shift to compensate time and frequency offsets induced by a distance and a velocity of the communication node with respect to the user equipment.

13. The non-transitory, computer-readable medium of claim 11, wherein the communication node is configured to emit a plurality of beams, and wherein the instructions cause the processing circuitry to:
execute a preamble detection for at least a portion of the plurality of beams emitted by the communication node;
determine a signal strength associated with the first signal based on the preamble detection; and
determine the first signal in the first beam time slot based on the signal strength.

14. The non-transitory, computer-readable medium of claim 11, wherein the instructions cause the processing circuitry to determine the second signal being in the second beam time slot based on information associated with the first signal, a time provided by the user equipment, a location of the user equipment, or predicted movement associated with the communication node.

15. An electronic device, comprising:
a transceiver; and
processing circuitry communicatively coupled to the transceiver and configured to:
at a first communication cycle, receive positional information associated with a communication node from a first signal in a first beam time slot using preamble detection; and
at a second communication cycle, receive a second signal in a second beam time slot, different from the first beam time slot, based on the positional information.

16. The electronic device of claim 15, wherein the processing circuitry is configured to:
communicatively couple to the communication node, and wherein the communication node is configured to emit a plurality of beams; and
extract a plurality of parameters that comprises a root sequence, a spreading code, and a scrambling code associated with at least a portion of the plurality of beams.

17. The electronic device of claim 15, wherein the processing circuitry is configured to utilize a mathematical model to simulate communication node movement to obtain predicted movement associated with the communication node.

18. The electronic device of claim 17, wherein the processing circuitry is configured to:
receive a request for synchronizing the electronic device to the communication node from a Layer (L1) controller, wherein the request comprises a node identifier associated with the communication node;
extract a plurality of radio parameters based on the node identifier; and
at the second communication cycle, determine a beam identifier of the second signal based on the plurality of radio parameters, the positional information, and the mathematical model simulating movement of the communication node.

19. The electronic device of claim 15, wherein the processing circuitry is configured to:
determine one or more signal conditions associated with the first signal, wherein the one or more signal conditions comprise a detected preamble status, a first indication of signal strength, or a second indication of signal quality; and
determine a first beam identifier associated with the first signal based on the one or more signal conditions.

20. The electronic device of claim 15, wherein the positional information comprises orientation information associated with the communication node or predicted movement associated with the communication node, and wherein the processing circuitry is configured to, at the second communication cycle, determine the second beam in the second beam time slot based on the orientation information or the predicted movement.

* * * * *